US008810453B2

(12) United States Patent
Li (10) Patent No.: US 8,810,453 B2
(45) Date of Patent: Aug. 19, 2014

(54) METHOD AND SYSTEM FOR HEURISTIC LOCATION TRACKING

(75) Inventor: Andrey Li, Ottawa (CA)

(73) Assignee: BlackBerry Limited, Waterloo (CA)

( * ) Notice: Subject to any disclaimer, the term of this patent is extended or adjusted under 35 U.S.C. 154(b) by 311 days.

(21) Appl. No.: 13/016,139

(22) Filed: Jan. 28, 2011

(65) Prior Publication Data
US 2012/0194388 A1    Aug. 2, 2012

(51) Int. Cl.
*G01S 3/02* (2006.01)

(52) U.S. Cl.
USPC .......................................................... 342/450

(58) Field of Classification Search
USPC ........................................... 342/357.54, 450
See application file for complete search history.

(56) References Cited

U.S. PATENT DOCUMENTS

| 6,243,039 | B1 | 6/2001 | Elliot | |
|---|---|---|---|---|
| 6,674,368 | B2 * | 1/2004 | Hawkins et al. | 340/573.4 |
| 2004/0156326 | A1 | 8/2004 | Chithambaram | |
| 2004/0198386 | A1 | 10/2004 | Dupray | |
| 2005/0085257 | A1 | 4/2005 | Laird et al. | |
| 2007/0026871 | A1 | 2/2007 | Wager | |
| 2010/0136944 | A1 * | 6/2010 | Taylor et al. | 455/404.1 |
| 2010/0203901 | A1 * | 8/2010 | Dinoff et al. | 455/456.3 |
| 2010/0255856 | A1 | 10/2010 | Kansal et al. | |
| 2011/0098059 | A1 * | 4/2011 | Qiu et al. | 455/456.2 |
| 2011/0099046 | A1 * | 4/2011 | Weiss et al. | 705/7.31 |

OTHER PUBLICATIONS

EP Application No. 11152496.3, Extended European Search Report dated Jun. 9, 2011.
Peter Pollack, "Sprint wants to help you track your kids", Apr. 13, 2006 at http://arstechnica.com/old/content/2006/04/6597.ars.
Sathiamoorthy Manoharan, "On GPS Tracking of Mobile Devices", Apr. 20-25, 2009 at http://www.computer.org/portal/web/csdl/doi/10.1109/ICNS.2009.103.
Canadian Office Action on Canadian Application No. 2,765,980, issued Jan. 13, 2014.

* cited by examiner

*Primary Examiner* — Harry Liu
(74) *Attorney, Agent, or Firm* — Moffat & Co.

(57) ABSTRACT

A method and system for provision of a notification based on location of a target device and heuristic information, the method maintaining, in a storage module, a location profile of a target mobile device based on heuristic information for the target mobile device; receiving the current location of the target mobile device; verifying whether the current location deviates from the location profile; and if the current location deviates from the location profile, triggering a notification to an observer device.

22 Claims, 5 Drawing Sheets

METHOD AND SYSTEM FOR HEURISTIC LOCATION TRACKING

FIELD OF THE DISCLOSURE

The present disclosure relates to location tracking on a mobile device and in particular to location tracking based on heuristics.

BACKGROUND

Many mobile devices are now equipped with the ability to determine their location and to report the location to others. While this provides many advantages, it also raises privacy issues, as some applications allow observers to track the location of users anywhere, and anytime.

Specifically, it is useful and desirable to allow observers to track the location of mobile device users in some circumstances. In other circumstances, this ability infringes upon the users' right to privacy.

BRIEF DESCRIPTION OF THE DRAWINGS

The present disclosure will be better understood with reference to the drawings in which.

DETAILED DESCRIPTION

According to one aspect of the present disclosure, there is provided a method comprising: maintaining, in a storage module, a location profile of a target mobile device based on heuristic information for the target mobile device; receiving the current location of the target mobile device; verifying whether the current location deviates from the location profile; and if the current location deviates from the location profile, triggering a notification to an observer device.

According to another aspect of the present disclosure, there is provided a network element comprising: a communication subsystem; a processor; memory; wherein the communications subsystem, processor and memory cooperate to: maintain, in a storage module, a location profile of a target mobile device based on heuristic information for the target mobile device; receive the current location of the target mobile device; verify whether the current location deviates from the location profile; and if the current location deviates from the location profile, trigger a notification to an observer device.

The present disclosure is described below with regards to various embodiments. Such embodiments are not intended to be limiting and could be modified by those skilled in the art and still be within the scope of the present disclosure. In particular, the present disclosure could be applied to any location determination technology, such as Global Positioning System (GPS), Assisted GPS, and others.

The present disclosure relates to the tracking of at least one device by an observer while still considering privacy issues. This is done by using the tracking device to collect data. The data is then analyzed and compared to heuristic information to determine whether a notification should be triggered. The notification can be sent to an observer. The trigger is based on rules based on positional or other data, as provided below.

Figure 1:
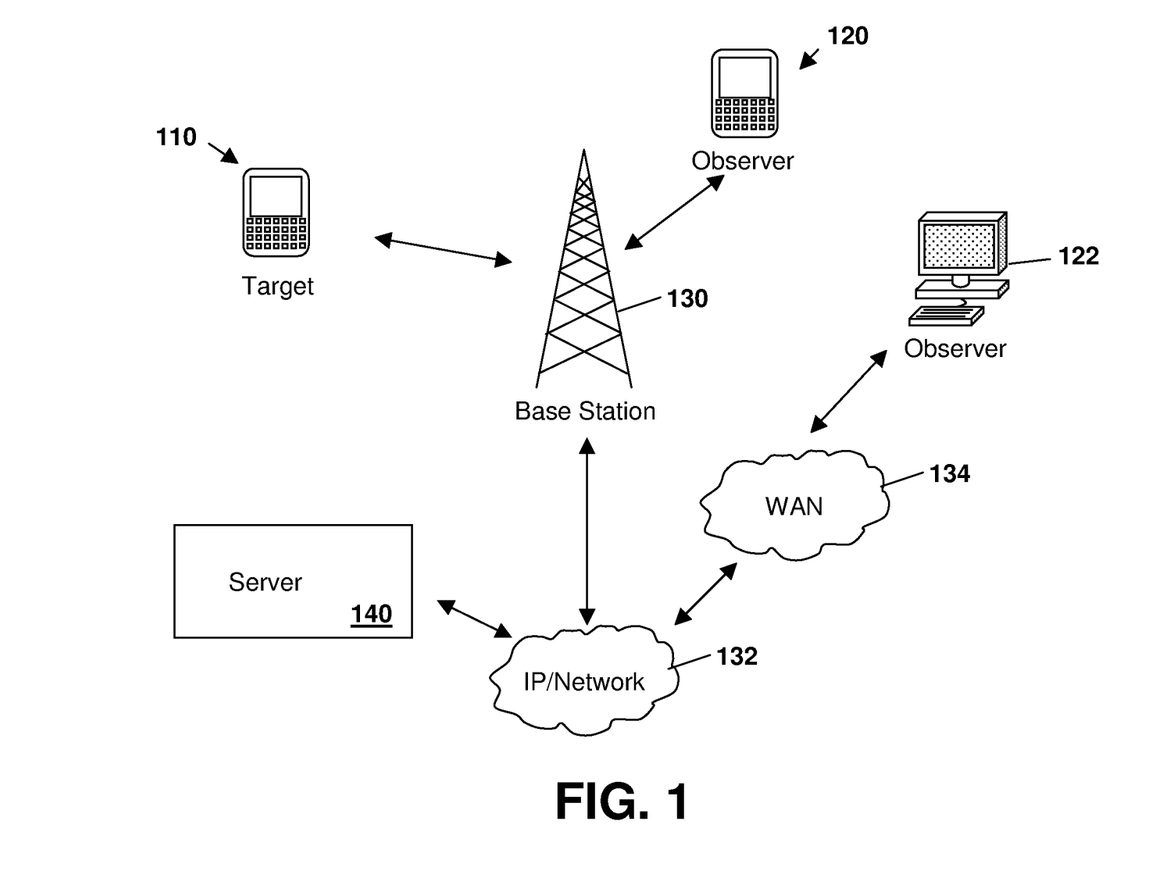
FIG. 1 is a block diagram showing an exemplary architecture for the method and system of the present disclosure.

Reference is now made to FIG. 1, which shows an exemplary architecture for one embodiment of a system in accordance with the present disclosure.

In FIG. 1, a target device 110 communicates with a mobile network 130. In one embodiment, target device 110 is a mobile device and network 130 is a wireless network. Such a network can include, but is not limited to a Code Division Multiple Access (CDMA) network, a Global System for Mobile communications (GSM), Universal Mobile Terrestrial System (UMTS), Long Term Evolution (LTE), Long Term Evolution Advanced (LTE-A), among others. In other embodiments network 130 can include an access point and be a WiFi™ or WiMAX™ system. Other networks 130 will be known to those skilled in the art.

Network 130 can communicate with a further IP network 132 such as the Internet, which may communicate, in some cases, with a wide area network (WAN) 134.

An observer 120 or 122 can also communicate with network 130 through wired or wireless communication channels. For example, observer 120 may be a mobile device or observer 122 may be a fixed computer.

A server 140 may further communicate with observer 120 or 122 through network 130, typically through IP network 132. Server 140 may be used in some embodiments where privacy requires that raw information not be sent to an observer 120 or 122.

Target device 110 may be any mobile device. Mobile devices are known to those in the art and can also be referred to as a mobile terminal, mobile station, personal digital assistant, smart phone, laptop, among others.

In the first portion of the present method, which will hereinafter be referred to as the "learning phase", a tracked mobile device collects location information at intervals in order to build a location history, or a location profile for the mobile device.

For example, according to a non-limiting embodiment of the present method, a mobile device builds its location history or profile (hereinafter, the terms 'history' and 'profile' are used interchangeably) based on a 24 hour cycle and 1 hour intervals. In this embodiment, the mobile device collects its location data once every hour and analyzes readings made at the same time of day together.

Specifically, if a location reading is taken at 9 AM on a first day, subsequent readings will occur at 10 AM, 11 AM, noon, 1 PM, and so on. For analysis purposes, the location reading taken at 9 AM on the following day will be compared with the location reading taken at 9 am on the first day. As would be appreciated by those skilled in the art, the above is merely an example, and other cycles than 24 hours or other intervals than one hour are also possible.

The length of the learning phase can vary between embodiments. In a typical embodiment, the learning phase would last for 10 to 20 cycles. In other embodiments, the learning phase is ongoing and the location profile is continuously refined. In yet another embodiment, the learning phase may continue until certain conditions are met. For example, in some embodiments, the learning phase may continue until the standard deviation calculated for each time interval within a cycle is less than a threshold.

The results of the location readings are then stored and analyzed in order to create the user's location profile. In one embodiment, the readings are stored and analyzed on the mobile device. In other embodiments, the readings are transferred to the observer device for storage and analysis. In yet another embodiment, the readings are transferred to an application server on the network.

In some embodiments, the readings are transferred to the observer device or an application server using a secure data protocol.

In embodiments where the readings are transferred to the observer device for storage and analysis, the readings should remain invisible to the user of the observer device, as they represent the raw location data of the tracked mobile device.

Figure 2:
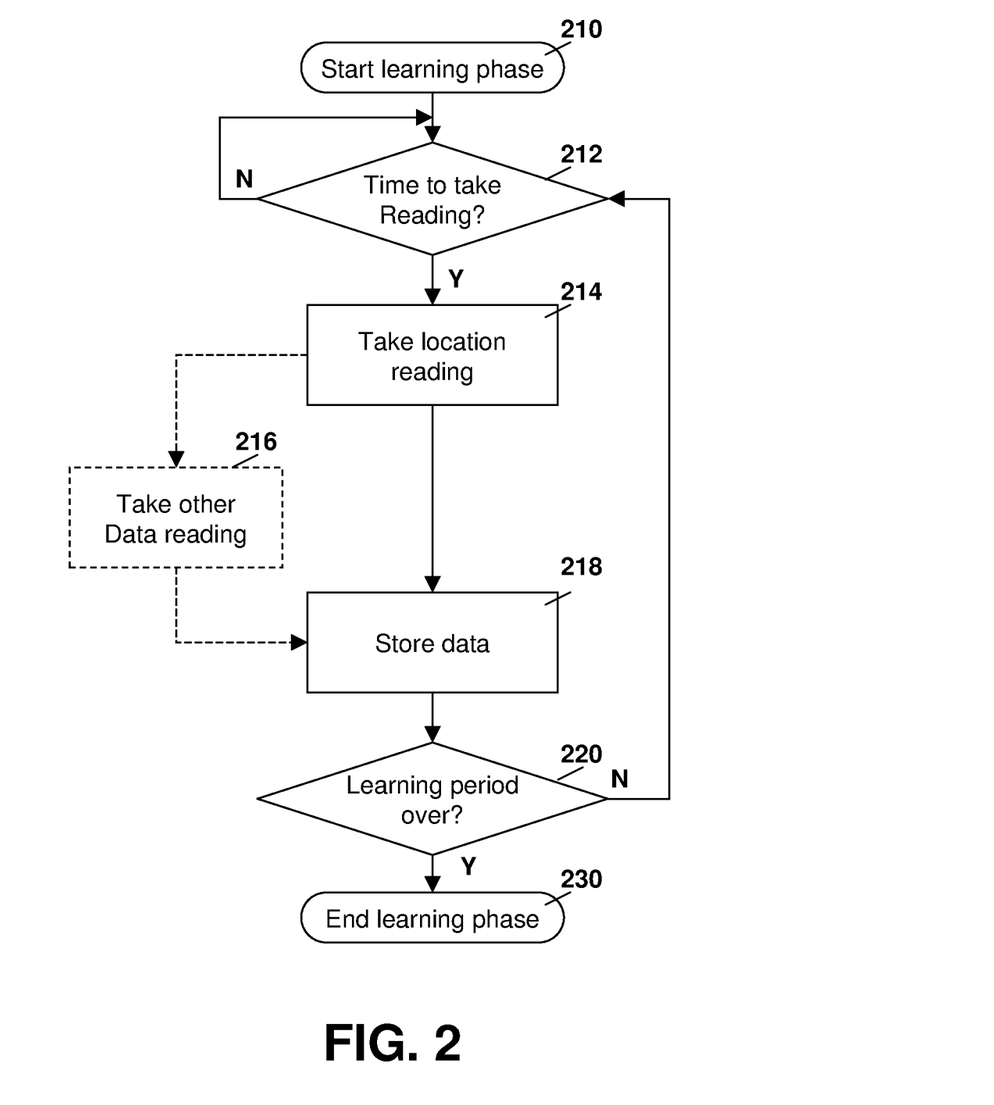
FIG. 2 is a block diagram of an exemplary learning method.

The above is shown, for example, with reference to FIG. 2. The process of FIG. 2 starts at block 210 and proceeds to block 212 in which a check is made to determine whether it is time to take a reading. If not the process continues to loop to block 212 until it is time to take a reading. As will be appreciated by those in the art having regard to the present disclosure, the check of block 212 can be implemented in a variety of ways including a timer, an interrupt, among other options.

From block 212, the process proceeds to block 214 in which a location reading is taken. The location reading of block 214 can utilize an internal Global Positioning System (GPS) within the device, assisted GPS using a base station, an external GPS communicating with the device through short range communications, among other options.

From block 214 the process may optionally proceed to block 216 to collect other heuristic data. For example in block 216 data from an accelerometer may be recorded, data from a temperature sensor may be recorded or other data from external or internal sensors may be utilized. The present disclosure is not limited by any such sensor or data.

From block 216, or from block 214 if block 216 is not used, the process proceeds to block 218 in which the data is stored. The data may be stored on the device being tracked or may be reported directly to an observer to store the data on the observer's device.

From block 218 the process proceeds to block 220 to check whether the learning period or stage is over. If no the process proceeds to block 212 to determine the next time to take a reading.

If it is determined in block 220 that the learning period is over the process proceeds to block 230 and ends the learning process.

As new readings are taken and stored, the device on which they are stored (the tracked device, observer device, or an application server) performs an analysis to create a location profile for the mobile device.

The purpose of the location profile is to enable the detection of significant deviations from a user's usual traveling habits in order to alert the observer of such a deviation. Accordingly, the location profile can be computed in a number of ways, as long as this objective is achieved.

In one embodiment, described in greater detail below, the location profile is based on a normal distribution of locations for each reading time. Other methods of computing a location profile are also within the scope of the present disclosure.

In this embodiment, an average position for each interval within the cycle is calculated, as is the standard deviation for the position, using standard statistical techniques. An example is provided in FIG. 3.

Figure 3:
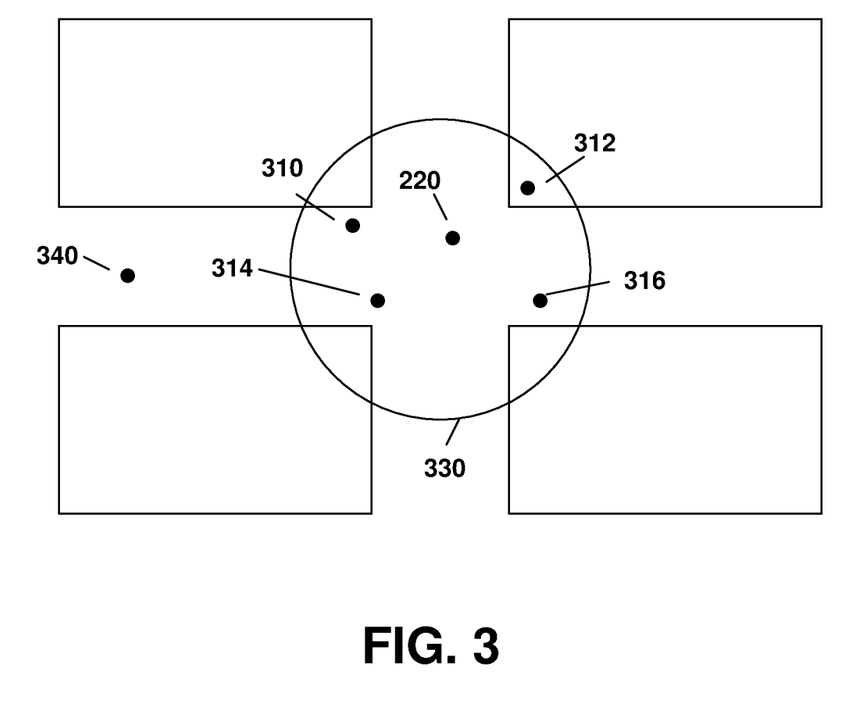
FIG. 3 is a block diagram illustrating the computation of the location profile according to one embodiment.

In FIG. 3, location readings 310, 312, 316 and 318 were all made during the learning phase. The average location reading is shown at 320. A circle 330, centered around average location 320, has a radius which is computed as a function of the standard deviation. For example, in one embodiment, the radius of circle 330 is equal to 3 times the standard deviation.

At a time after the learning phase, a location reading 340 is made. As reading 340 is outside of circle 330, it is deemed to be unusual and the observer is notified. In one embodiment, the observer is simply notified that the tracked user has deviated from his location profile without providing further details. In another embodiment, the observer is notified of the extent by which the tracked user has deviated, and in yet another embodiment, the notification could include the exact location of the tracked user when the reading took place.

In some embodiments, the learning phase might be constrained by rules which would ensure greater data integrity. For example, on some occasions, the user might travel far from its usual destinations, and readings taken on such occasions would contaminate the data.

Accordingly, in one embodiment, the user may be allowed to turn off the learning mode temporarily. In another embodiment, readings which are too far (according to, for example, a threshold value) from an existing average value are simply discarded for the purposes of the learning phase.

Based on the above, a tracked user's behavior is learned.

Figure 4:
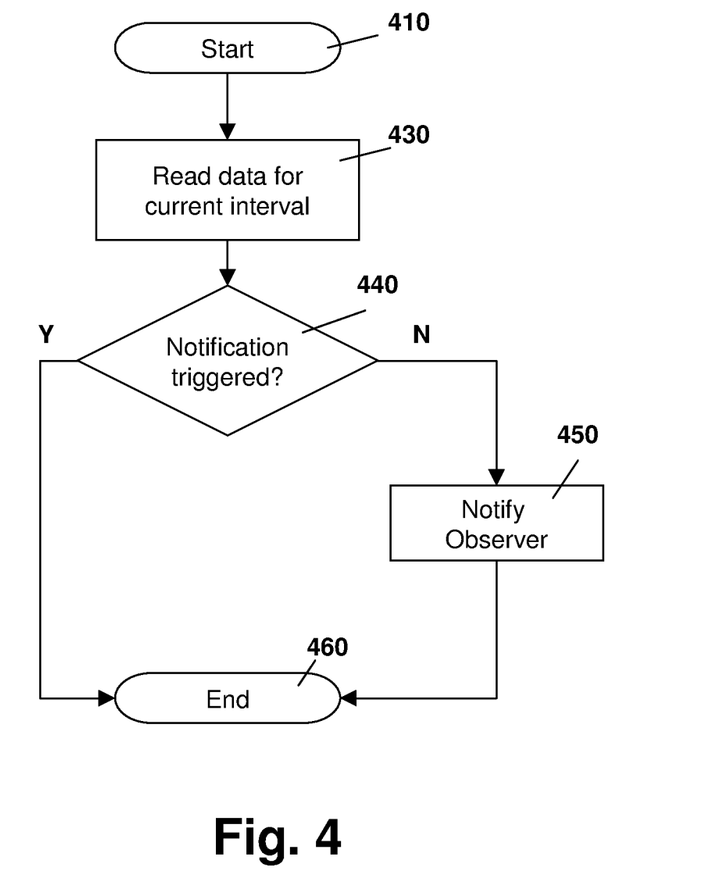
FIG. 4 is a block diagram of a method according to one embodiment.

Reference is now made to FIG. 4, which shows a block diagram of a method according to the above embodiment. The learning phase of FIG. 2 has been completed prior to the process of FIG. 4 being used.

The process starts at block 410 and proceeds to block 430 in which the tracked mobile device reads its current location. In some embodiments, this may occur at fixed times which may or may not correspond to the intervals of the cycle during the learning phase. In other embodiments, the mobile device may read its current location almost continuously. In yet further embodiments, the reading may be based on polling by the observer.

From block 430 the process proceeds to block 440, in which a check is made to determine whether the current location is within the expected range. As per the above, the check may be computed at the target device, an application server, or the observer device. In that case, the current location is sent to the observer device or the application server prior to determining whether the current location is within the expected range.

As discussed above, the expected range is typically the average location for a given time, plus a function of the standard deviation as computed during the learning phase.

Further, the reading of block 430 and calculation of block 440 can include other data from the target device, such as accelerometer readings, temperature readings, available network readings, battery level, or other data known to the target device.

If the location is within the expected range, or if other rules to trigger a notification are not met, the method ends at block 460 until a new measurement is made. Once the new measurement is made, the process starts again from block 430.

If the check of block 440 causes a notification trigger, the process proceeds to block 350, where the observer is notified. From block 450 the process then proceeds to block 360 and ends until another measurement is made.

The above method could be further refined by allowing either the observer or the user to set rules for determining when to notify the observer.

For example, a rule could be set by the observer, so that the observer is notified of only the second deviation by the user in a given day. Another rule could specify a threshold distance from the average location, beyond which the observer would be notified. As would be appreciated by those skilled in the art, such a rule could be set to override the error range computed as a function of the standard deviation in some embodiments.

Yet another kind of rule could allow the observer or the user to define a large area, in which the user is expected to be at given times. For example, if the user is a student at a university, the area corresponding to the university campus could be entered into the system, via the user's mobile device or the observer's mobile device, and the observer would be notified when the user is a certain distance away from the campus at a relevant time.

In some cases, it may be desirable to notify the observer that the tracked mobile device is in a particular location, irrespective of the user's location history. For example, a parent may want to be notified if his or her child is venturing into a dangerous area of a city. In this scenario, the parent could configure the notification application to notify the observer anytime the tracked user enters an area designated as dangerous, or simply prohibited, by the parent.

The above rules are only provided as examples, and any number of rules could be implemented as would be appreciated by those skilled in the art.

The above rules can be implemented in block 440 of FIG. 4 to check whether a rule has been satisfied by the latest reading. As would be appreciated by those skilled in the art, all data pertaining to these rules will need to be transferred from the device on which the rules were entered to the device on which the analysis portion of the method is performed.

In other embodiments, the present method and apparatus can also learn a profile, and detect deviation from the profile, based on more parameters than just location.

Many mobile devices today are equipped with a whole array of sensors, including but not limited to, accelerometers, sensors for measuring temperature, luminosity, and atmospheric pressure. These sensors can collect data similarly to the location detection means for use in the present method.

For example, temperature data could be collected and correlated with other data such as time, and data from other sensors. The collected data would then be analyzed for pattern recognition, allowing the system to detect future deviations from established patterns.

In one embodiment, temperature data is collected continuously from a temperature sensor on a mobile device. As this data is of significant size, in most cases it will be preferable to store the data locally, however, it may also be advantageous to transfer the data to a server or an observer device for storage.

The stored temperature data is then analyzed for pattern recognition. In one example, the data may reveal a pattern which suggests that for 15 to 20 minutes everyday, around 10:30 am, the temperature drops significantly from the temperature observed throughout the day. This could be caused by the user of the mobile device going out during recess at school.

If, at one point after the pattern has been learned by the system, the user of the mobile device fails to go out during recess, or if the user remains outside for significantly longer than usual, the system will detect this deviation from established patterns, and notify an observer.

As would be appreciated by those skilled in the art, the above example is merely illustrative and any type of sensor could be used to collect data. Furthermore, any number of sensor can be used to generate data, and data from various sensors may be correlated against each other in order to extract meaningful patterns.

In these cases, as in the location and temperature cases discussed above, the data from the sensors is stored and analyzed for pattern recognition. When an event deviates significantly from the established patterns, the observer device is notified as described above.

In other embodiments, an observer device may be notified according to rules set by the observer, as described above with respect to location. Under this scenario, the user of the observer device (also referred to herein as the "observer"), sets conditions based on the various sensor data collected by the observed device. As will be appreciated by those skilled in the art, these conditions may or may not relate to patterns detected during the learning phase. When these conditions are met, the observer device is notified.

The notification may also vary depending on severity. For example, a child leaving a school by foot, as determined by an accelerometer, may trigger a low severity notification to a parent. The notification may simply be that the child has left the school premises at a certain time. Conversely, a child leaving a school by vehicle may cause more concern to a parent, and more information such as the road that the child is on or even the exact location of the child may be provided in this case.

Thus the trigger of block 440 could have various severity levels and the notification of block 450 may provide different information levels based on the severity of the trigger.

Based on the above, a target device 110 may include software or program code to determine a location and other data that may be relevant to an observer. In one embodiment target device may also include software for notifying an observer. In this case, raw data may never be sent across a network and instead the notification software may make a determination of whether an alert or notification should be sent.

In other embodiments, the target 110 may sent the information to notification software located either on server 140 or on an observer device 120 or 122. If the information is sent to an observer device 120 or 122, software within the device may prevent the disclosure of the raw information to the user of the observer device 120 or 122.

If the raw data is sent to server 140, server 140 can make the determination, utilizing software on the server 140, of whether to send a notification to observer 120 or 122.

In each case, device 110, 120, 122 or 130 include a processor and memory to execute program code to analyze the data and determine whether a notification should be triggered.

Figure 5:
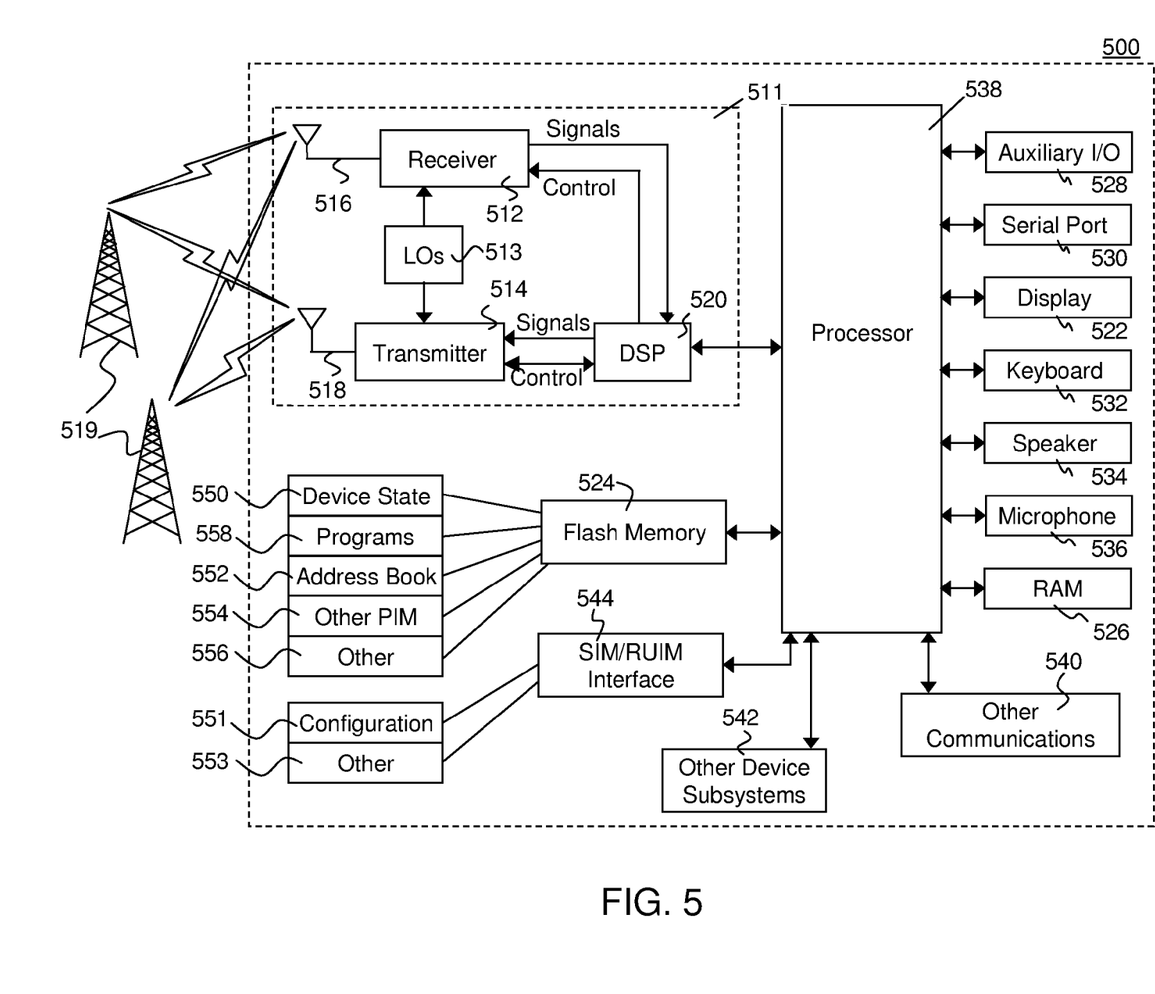
FIG. 5 is a block diagram of an exemplary user equipment capable of being used with the present method and system.

Target device 110 or observer device 120 can be any mobile device. One such exemplary mobile device is illustrated below with reference to FIG. 5. The mobile device of FIG. 5 is however not meant to be limiting and other mobile devices could also be used.

Mobile device 500 is typically a two-way wireless communication device having voice and data communication capabilities. Mobile device 500 generally has the capability to communicate with other devices or computer systems. Depending on the exact functionality provided, the mobile device may be referred to as a data messaging device, a two-way pager, a wireless e-mail device, a cellular telephone with data messaging capabilities, a wireless Internet appliance, a wireless device, a user equipment, or a data communication device, as examples.

Where mobile device 500 is enabled for two-way communication, it will incorporate a communication subsystem 511, including both a receiver 512 and a transmitter 514, as well as associated components such as one or more antenna elements 516 and 518, local oscillators (LOs) 513, and a processing module such as a digital signal processor (DSP) 520. As will be apparent to those skilled in the field of communications, the particular design of the communication subsystem 511 will be dependent upon the communication network in which the device is intended to operate.

Network access requirements will also vary depending upon the type of network 519. In some networks, network access is associated with a subscriber or user of mobile device 500. A mobile device may require a removable user identity module (RUIM) or a subscriber identity module (SIM) card in order to operate on the network. The SIM/RUIM interface 544 may be similar to a card-slot into which a SIM/RUIM card can be inserted and ejected like a diskette or PCMCIA card. The SIM/RUIM card can have memory and hold many key configuration 551, and other information 553 such as identification, and subscriber related information.

When required network registration or activation procedures have been completed, mobile device 500 may send and receive communication signals over the network 519. As illustrated in FIG. 5, network 519 can consist of multiple base stations communicating with the mobile device. For example, in a hybrid CDMA 1×EVDO system, a CDMA base station and an EVDO base station communicate with the mobile station and the mobile device is connected to both simultaneously. In other systems such as Long Term Evolution (LTE) or Long Term Evolution Advanced (LTE-A), multiple base stations may be connected to for increased data throughput. Other systems such as GSM, GPRS, UMTS, HSDPA, among others are possible and the present disclosure is not limited to any particular cellular technology.

Signals received by antenna 516 through communication network 519 are input to receiver 512, which may perform such common receiver functions as signal amplification, frequency down conversion, filtering, channel selection and the like, and in the example system shown in FIG. 5, analog to digital (A/D) conversion. A/D conversion of a received signal allows more complex communication functions such as demodulation and decoding to be performed in the DSP 520. In a similar manner, signals to be transmitted are processed, including modulation and encoding for example, by DSP 520 and input to transmitter 514 for digital to analog conversion, frequency up conversion, filtering, amplification and transmission over the communication network 519 via antenna 518. DSP 520 not only processes communication signals, but also provides for receiver and transmitter control. For example, the gains applied to communication signals in receiver 512 and transmitter 514 may be adaptively controlled through automatic gain control algorithms implemented in DSP 520.

Mobile device 500 generally includes a processor 538 which controls the overall operation of the device. Communication functions, including data and voice communications, are performed through communication subsystem 511. Processor 538 also interacts with further device subsystems such as the display 522, flash memory 524, random access memory (RAM) 526, auxiliary input/output (I/O) subsystems 528, serial port 530, one or more keyboards or keypads 532, speaker 534, microphone 536, other communication subsystem 540 such as a short-range communications subsystem and any other device subsystems generally designated as 542. Serial port 530 could include a USB port or other port known to those in the art having the benefit of the present disclosure.

Some of the subsystems shown in FIG. 5 perform communication-related functions, whereas other subsystems may provide "resident" or on-device functions. Notably, some subsystems, such as keyboard 532 and display 522, for example, may be used for both communication-related functions, such as entering a text message for transmission over a communication network, and device-resident functions such as a calculator or task list, among other applications.

Operating system software used by the processor 538 may be stored in a persistent store such as flash memory 524, which may instead be a read-only memory (ROM) or similar storage element (not shown). Those skilled in the art will appreciate that the operating system, specific device applications, or parts thereof, may be temporarily loaded into a volatile memory such as RAM 526. Received communication signals may also be stored in RAM 526.

As shown, flash memory 524 can be segregated into different areas for both computer programs 558 and program data storage 550, 552, 554 and 556. These different storage types indicate that each program can allocate a portion of flash memory 524 for their own data storage requirements. The applications may be segregated based on the mode or category they fall into. Memory 524 may further provide security for corporate data and if some applications are locked while others are not.

Processor 538, in addition to its operating system functions, may enable execution of software applications on the mobile device. A predetermined set of applications that control basic operations, including at least data and voice communication applications for example, will normally be installed on mobile device 500 during manufacturing. Other applications could be installed subsequently or dynamically.

Applications and software, such as those for implements the process of FIGS. 2, 3 and 4, may be stored on any computer readable storage medium. The computer readable storage medium may be a tangible or intransitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application may have the ability to send and receive data items, via the wireless network 519. In one embodiment, the PIM data items are seamlessly integrated, synchronized and updated, via the wireless network 519, with the mobile device user's corresponding data items stored or associated with a host computer system. Further applications may also be loaded onto the mobile device 500 through the network 519, an auxiliary I/O subsystem 528, serial port 530, short-range communications subsystem 540 or any other suitable subsystem 542, and installed by a user in the RAM 526 or a non-volatile store (not shown) for execution by the processor 538. Such flexibility in application installation increases the functionality of the device and may provide enhanced on-device functions, communication-related functions, or both. For example, secure communication applications may enable electronic commerce functions and other such financial transactions to be performed using the mobile device 500.

In a data communication mode, a received signal such as a text message or web page download will be processed by the communication subsystem 511 and input to the processor 538, which may further process the received signal for output to the display 522, or alternatively to an auxiliary I/O device 528.

A user of mobile device 500 may also compose data items such as email messages for example, using the keyboard 532, which may be a complete alphanumeric keyboard or telephone-type keypad, among others, in conjunction with the display 522 and possibly an auxiliary I/O device 528. Such composed items may then be transmitted over a communication network through the communication subsystem 511.

For voice communications, overall operation of mobile device 500 is similar, except that received signals would typically be output to a speaker 534 and signals for transmission would be generated by a microphone 536. Alternative voice or audio I/O subsystems, such as a voice message recording subsystem, may also be implemented on mobile device 500. Although voice or audio signal output is preferably accomplished primarily through the speaker 534, display 522 may also be used to provide an indication of the identity of a calling party, the duration of a voice call, or other voice call related information for example.

Serial port 530 in FIG. 5 would normally be implemented in a personal digital assistant (PDA)-type mobile device for which synchronization with a user's desktop computer (not shown) may be desirable, but is an optional device component. Such a port 530 would enable a user to set preferences through an external device or software application and would extend the capabilities of mobile device 500 by providing for information or software downloads to mobile device 500 other than through a wireless communication network. The alternate download path may for example be used to load an encryption key onto the device through a direct and thus reliable and trusted connection to thereby enable secure device communication. As will be appreciated by those skilled in the art, serial port 530 can further be used to connect the mobile device to a computer to act as a modem.

Other communications subsystems 540, such as a short-range communications subsystem, is a further optional component which may provide for communication between mobile device 500 and different systems or devices, which need not necessarily be similar devices. For example, the subsystem 540 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method comprising:
   maintaining, in a storage module, a location profile of a target mobile device;
   receiving the current location of the target mobile device;
   verifying whether the current location deviates from the location profile; and
      if the current location deviates from the location profile, triggering a notification to an observer device;
   wherein the notification includes a distance by which the current location deviates from the location profile.

2. The method of claim 1, wherein the location profile is created during a learning phase.

3. The method of claim 2, wherein the location profile includes an expected location and an error range for each time period of a time cycle.

4. The method of claim 3, further comprising the step of:
   looking up the expected location and the error range for the current time period of the time cycle; and
   determining whether the current location is within an area defined by the expected location and the expected error range.

5. The method of claim 4, wherein the learning phase comprises:
   during each time period of the time cycle, and for N time cycles, reading the current location of the target mobile device;
   computing an average and a standard deviation of the location for each period within the time cycle;
   wherein N is a positive integer.

6. The method of claim 5 wherein the error range for each time period of the time cycle is a function of the standard deviation for the time period.

7. The method of claim 1, wherein the storage module is on the observer device, target mobile device or an application server.

8. The method of claim 1, further including the steps of:
   maintaining a list of prohibited geographical areas; and
   after the step of reading the current location, if the current location is within a prohibited area of the list of prohibited geographical areas, notifying the observer device.

9. The method of claim 1, wherein the verifying step comprises:
   evaluating each one of a set of rules based on said current location;
   if at least one rule of the set of rules is satisfied during the evaluating step, notifying the observer device.

10. The method of claim 1, further comprising receiving supplementary data for the target mobile device, wherein the verifying utilizes the supplementary data in determining whether to trigger a notification.

11. The method of claim 10, wherein the verifying utilizes rules related to the supplemental data and location to determine whether to trigger the notification.

12. A network element comprising:
   a communication subsystem;
   a processor;
   memory;
   wherein the communications subsystem, processor and memory cooperate to:
      maintain, in a storage module, a location profile of a target mobile device;
      receive the current location of the target mobile device;
      verify whether the current location deviates from the location profile; and
         if the current location deviates from the location profile, trigger a notification to an observer device;
      wherein the notification includes a distance by which the current location deviates from the location profile.

13. The network element of claim 12, wherein the location profile includes an expected location and an error range for each time period of a time cycle.

14. The network element of claim 13, wherein the communications subsystem, processor and memory further cooperate to:
   look up the expected location and the error range for the current time period of the time cycle; and
   determine whether the current location is within an area defined by the expected location and the expected error range.

15. The network element of claim 14, wherein the communications subsystem, processor and memory further cooperate to:
  during each time period of the time cycle, and for N time cycles, read the current location of the target mobile device; and
  compute an average and a standard deviation of the location for each period within the time cycle;
  wherein N is a positive integer.

16. The network element of claim 15 wherein the error range for each time period of the time cycle is a function of the standard deviation for the time period.

17. The network element of claim 12, wherein the communications subsystem, processor and memory further cooperate to:
  maintain a list of prohibited geographical areas; and
  after reading the current location, if the current location is within a prohibited area of the list of prohibited geographical areas, notify the observer device.

18. The network element of claim 12, wherein the communications subsystem, processor and memory cooperate to verify by:
  evaluating each one of a set of rules based on said current location;
  if at least one rule of the set of rules is satisfied during the evaluating, notifying the observer device.

19. The network element of claim 12, wherein the communications subsystem, processor and memory cooperate to receive supplementary data for the target mobile device, wherein the verifying utilizes the supplementary data in determining whether to trigger a notification.

20. The network element of claim 19, wherein the verifying utilizes rules related to the supplemental data and location to determine whether to trigger the notification.

21. The network element of claim 12, wherein the network element is the observer device, target mobile device or an application server.

22. A non-transitory computer readable medium having computer readable instructions stored thereon for execution on a network element so as to implement the method of claim 1.

* * * * *